US010982059B2

(12) United States Patent
Kanuteh et al.

(10) Patent No.: US 10,982,059 B2
(45) Date of Patent: Apr. 20, 2021

(54) LONG FIBER-REINFORCED PROPYLENE COMPOSITION FOR USE IN A THIN PART

(71) Applicant: Celanese International Corporation, Irving, TX (US)

(72) Inventors: Jimmy Kanuteh, Offenbach am Main (DE); Markus Dehe, Lahnstein (DE); Uta Schoenwald-Otten, Rodenbach (DE); Juergen Stuermer, Giessen (DE); Paul Kenny, Holmen, WI (US); Timothy L. Tibor, Winona, MN (US)

(73) Assignee: Celanese International Corporation, Irving, TX (US)

( * ) Notice: Subject to any disclaimer, the term of this patent is extended or adjusted under 35 U.S.C. 154(b) by 291 days.

(21) Appl. No.: 15/865,305

(22) Filed: Jan. 9, 2018

(65) Prior Publication Data
US 2018/0194909 A1 Jul. 12, 2018

Related U.S. Application Data

(60) Provisional application No. 62/570,689, filed on Oct. 11, 2017, provisional application No. 62/520,658, filed on Jun. 16, 2017, provisional application No. 62/444,583, filed on Jan. 10, 2017.

(51) Int. Cl.
| | |
|---|---|
| *C08F 110/06* | (2006.01) |
| *C08F 210/06* | (2006.01) |
| *C08J 5/10* | (2006.01) |
| *C08F 10/06* | (2006.01) |
| *C08F 8/50* | (2006.01) |
| *C08K 5/14* | (2006.01) |
| *C08K 7/14* | (2006.01) |
| *C08L 23/12* | (2006.01) |
| *C08L 23/14* | (2006.01) |
| *C08J 5/04* | (2006.01) |
| *B29C 45/00* | (2006.01) |
| *B29C 45/77* | (2006.01) |
| *B29L 31/30* | (2006.01) |

(52) U.S. Cl.
CPC ........... *C08J 5/043* (2013.01); *B29C 45/0005* (2013.01); *B29C 45/77* (2013.01); *C08F 8/50* (2013.01); *C08F 10/06* (2013.01); *C08J 5/10* (2013.01); *C08K 5/14* (2013.01); *C08K 7/14* (2013.01); *C08L 23/12* (2013.01); *C08L 23/14* (2013.01); *B29C 2945/76006* (2013.01); *B29L 2031/3008* (2013.01); *B29L 2031/3026* (2013.01); *B29L 2031/3044* (2013.01); *C08F 2500/12* (2013.01); *C08J 2323/12* (2013.01); *C08J 2323/14* (2013.01); *C08J 2423/12* (2013.01); *C08J 2423/14* (2013.01); *C08L 2205/02* (2013.01); *C08L 2314/06* (2013.01)

(58) Field of Classification Search
CPC ..... C08J 5/043; C08J 5/10; C08F 8/50; C08F 10/06; C08K 5/14; C08K 7/14; C08L 23/12; C08L 23/14
USPC ......................................................... 524/494
See application file for complete search history.

(56) References Cited

U.S. PATENT DOCUMENTS

| | | |
|---|---|---|
| RE32,772 E | 10/1988 | Hawley |
| 5,866,648 A | 2/1999 | Saito et al. |
| 6,090,319 A | 7/2000 | Sharma et al. |
| 6,284,831 B1 | 9/2001 | Shimpuku et al. |
| 6,521,693 B2 | 2/2003 | Saito et al. |
| 6,627,692 B2 | 9/2003 | Saito et al. |
| 6,649,685 B2 | 11/2003 | Saito et al. |
| 6,652,796 B1 | 11/2003 | Moriwaki et al. |
| 7,045,202 B2 | 5/2006 | Tanaka et al. |
| 7,442,435 B2 | 10/2008 | Lee et al. |
| 7,632,888 B2 | 12/2009 | Van Poucke et al. |
| 8,227,550 B2 | 7/2012 | Masarati et al. |
| 8,344,069 B2 | 1/2013 | Gahleitner et al. |
| 8,815,987 B2 | 8/2014 | Lederer et al. |
| 9,233,486 B2 | 1/2016 | Regan et al. |
| 9,233,651 B2 | 1/2016 | McClintock et al. |
| 9,255,166 B2 | 2/2016 | Grein et al. |
| 9,278,472 B2 | 3/2016 | Eastep et al. |
| 9,434,835 B2 | 9/2016 | Ter Woort et al. |

(Continued)

FOREIGN PATENT DOCUMENTS

| | | |
|---|---|---|
| CN | 101570612 A | 11/2009 |
| JP | H 0692508 B2 | 11/1994 |

(Continued)

OTHER PUBLICATIONS

Article—"New High Flow Long-Fiber Thermoplastic Composite Compounds from PlastiComp," *PlastiComp*, 2019, 6 pages.

(Continued)

*Primary Examiner* — Kelechi C Egwim
(74) *Attorney, Agent, or Firm* — Dority & Manning, P.A.

(57) ABSTRACT

A fiber-reinforced polymer composition that comprises a polymer matrix that contains a propylene polymer is provided. The polymer matrix constitutes from about 30 wt. % to about 80 wt. % of the composition, and a plurality of long reinforcing fibers that are distributed within the polymer matrix. The fibers constitute from about 20 wt. % to about 70 wt. % of the composition. The polymer composition exhibits a spiral flow length of about 450 millimeters or more as determined in accordance with ASTM D3123-09, and after aging at a temperature of 150° C. for 1,000 hours, a Charpy unnotched impact strength greater than about 15 kJ/m$^2$ as determined at a temperature of 23° C. in accordance with ISO Test No. 179-1:2010.

34 Claims, 2 Drawing Sheets

(56) References Cited

U.S. PATENT DOCUMENTS

| | | | |
|---|---|---|---|
| 9,650,504 B2 | 5/2017 | Kastner et al. | |
| 10,030,109 B2 | 7/2018 | Boragno et al. | |
| 10,174,189 B2 | 1/2019 | Jerabek et al. | |
| 2010/0069560 A1* | 3/2010 | Masarati | C08L 23/10 524/502 |
| 2010/0324225 A1 | 12/2010 | Zummallen | |
| 2012/0115995 A1 | 5/2012 | Lederer et al. | |
| 2014/0343196 A1* | 11/2014 | Kousaka | C08K 7/02 524/35 |
| 2018/0215909 A1 | 8/2018 | Kanuteh et al. | |

FOREIGN PATENT DOCUMENTS

| | | | |
|---|---|---|---|
| JP | H 10230517 A | 9/1998 | |
| JP | H 10310666 A | 11/1998 | |
| JP | H 11164753 A | 6/1999 | |
| JP | 2001192468 A | 7/2001 | |
| JP | 3214170 B2 | 10/2001 | |
| JP | 3387215 B2 | 3/2003 | |
| JP | 3399234 B2 | 4/2003 | |
| JP | 2004231911 A | 8/2004 | |
| WO | WO 2007/074877 A1 | 7/2007 | |
| WO | WO 2008/074712 A1 | 6/2008 | |
| WO | WO 2008/074715 A1 | 6/2008 | |
| WO | WO 2015/121160 A1 | 8/2015 | |

OTHER PUBLICATIONS

ASTM D3123-09—"Spiral Flow of Low-Pressure Thermosetting Molding Compounds," *ASTM International*, Sep. 1, 2009, 4 pages.
ISO 178:2010(E)—"Plastics—Determination of flexural properties," *ISO*, Dec. 15, 2010, 6 pages.
ISO 179-1:2010(E)—Plastics—Determination of Charpy impact properties—Part 1: Non-instrumented impact test, *ISO*, Jun. 15, 2010, 11 pages.
ISO 527-1:2012(E)—"Plastics—Determination of tensile properties—Part 1: General principles," *ISO*, Feb. 15, 2012, 11 pages.
Malnati, Peggy, "VOC reduction strategies for LFRT composites," *Composites World*, Aug. 31, 2015, 6 pages.
Product Information on StarRov® 490 from JohnsManville, Oct. 2016, 2 pages.

* cited by examiner

LONG FIBER-REINFORCED PROPYLENE COMPOSITION FOR USE IN A THIN PART

RELATED APPLICATIONS

The present application claims priority to U.S. Provisional Application Ser. No. 62/444,583, filed on Jan. 10, 2017, 62/520,658, filed on Jun. 16, 2017, and 62/570,689, filed on Oct. 11, 2017, which are incorporated herein in their entirety by reference thereto.

BACKGROUND OF THE INVENTION

Long fiber-reinforced polypropylene compositions are often employed in molded parts to provide improved mechanical properties. Typically, such compositions are formed by a process that involves extruding a propylene polymer through a impregnation die and onto a plurality of continuous lengths of reinforcing fibers. The polymer and reinforcing fibers are pulled through the die to cause thorough impregnation of individual fiber strands with the resin. Despite the benefits that can be achieved with such compositions, it is often difficult to effectively employ them in parts having a very thin wall thickness due to the high melt viscosity of conventional propylene polymers. While various attempts have been made to improve the flow properties of propylene polymers by lowering their melt viscosity, these efforts tend to have an adverse impact on the mechanical properties of the resulting composition, particularly after it is "aged"—i.e., exposed to relatively high temperatures (e.g., 150° C.) for a certain period of time. As such, a need currently exists for a fiber-reinforced propylene composition for use in forming shaped parts that can exhibit good flow properties and yet still retain sufficient mechanical properties for use in various types of applications.

SUMMARY OF THE INVENTION

In accordance with one embodiment of the present invention, a fiber-reinforced polymer composition is disclosed that comprises a polymer matrix that contains a propylene polymer, wherein the polymer matrix constitutes from about 30 wt. % to about 80 wt. % of the composition, and a plurality of long reinforcing fibers that are distributed within the polymer matrix. The fibers constitute from about 20 wt. % to about 70 wt. % of the composition. The polymer composition exhibits a spiral flow length of about 450 millimeters or more as determined in accordance with ASTM D3123-09, and after aging at a temperature of 150° C. for 1,000 hours, a Charpy unnotched impact strength greater than about 15 kJ/m² as determined at a temperature of 23° C. in accordance with ISO Test No. 179-1:2010.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
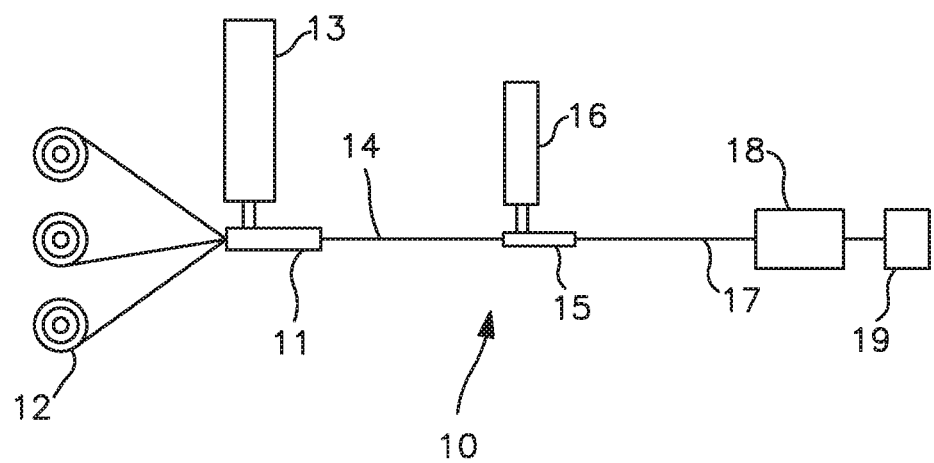
FIG. 1 is a schematic illustration of one embodiment of a system that may be used to form the fiber-reinforced polymer composition of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a fiber-reinforced composition for use in a shaped part (e.g., injection molded part) that contains a plurality of long reinforcing fibers that are distributed within a polymer matrix that contains a propylene polymer. Long fibers may, for example, constitute from about 20 wt. % to about 70 wt. %, in some embodiments from about 20 wt. % to about 65 wt. %, and in some embodiments, from about 30 wt. % to about 60 wt. % of the composition. Likewise, the polymer matrix typically constitutes from about 30 wt. % to about 80 wt. %, in some embodiments from about 35 wt. % to about 80 wt. %, and in some embodiments, from about 40 wt. % to about 70 wt. % of the composition.

The polymer matrix may be formed by melt blending a relatively high viscosity propylene polymer with a chain-scission agent. The chain-scission agent may, for instance, be a free radical-generating functional compound, such as an organic peroxide, which can result in beta chain scission of the polymer backbone during the melt extrusion process. Among other things, this can reduce the molecular weight and melt viscosity of the polymer under shear to result in a "high flow" propylene polymer. As a result, the resulting "high flow" propylene polymer may have a relatively high melt flow index, such as about 150 grams per 10 minutes or more, in some embodiments about 180 grams per 10 minutes or more, and in some embodiments, from about 200 to about 500 grams per 10 minutes, as determined in accordance with ISO 1133-1:2011 (technically equivalent to ASTM D1238-13) at a load of 2.16 kg and temperature of 230° C. Regardless of the actual value, the melt flow index of the "high flow" propylene polymer to the melt flow index of the neat propylene polymer prior to combination with the chain-scission agent is typically about 1.1 or more, in some embodiments about 1.2 or more, in some embodiments from about 1.3 to about 4.0, and in some embodiments, from about 1.4 to about 3.0. The neat propylene polymer may, for instance, have a relatively low melt flow index, such as about 200 grams per 10 minutes or less, in some embodiments about 180 grams per 10 minutes or less, and in some embodiments, from about 50 to about 150 grams per 10 minutes, as determined in accordance with ISO 1133-1:2011 (technically equivalent to ASTM D1238-13) at a load of 2.16 kg and temperature of 230° C.

Due to the high fluidity of the fiber-reinforced composition, relatively thin shaped parts (e.g., injection molded parts) can be readily formed therefrom. For example, such parts may have a thickness of about 4 millimeters or less, in some embodiments about 2.5 millimeters or less, in some embodiments about 2 millimeters or less, in some embodiments about 1.8 millimeters or less, and in some embodiments, from about 0.4 to about 1.6 millimeters (e.g., 1.2 millimeters). When forming an injection molded part, for instance, a relatively high "spiral flow length" can be achieved. The term "spiral flow length" generally refers to the length reached by the flow of the composition in a spiral flow channel when it is injected at constant injection temperature and injection pressure from a central gate of a mold in which the spiral flow channel is formed. The spiral flow length may, for instance, be about 450 millimeters or more, in some embodiments about 600 millimeters or more, and in some embodiments, from about 650 to about 1,000 millimeters, as determined in accordance with ASTM D3123-09 at a barrel temperature of 230° C., molding temperature of 40° C. to 60° C., and a maximum injection pressure of 860 bar. The injection pressure that may be employed to shape the fiber-reinforced composition into an injection molded part may also be relatively low, such as about 750 bar or less, in some embodiments about 700 bar or less, and in some embodiments, from about 300 to about 650 bar.

Conventionally, it was believed that compositions having such a low viscosity could not also possess sufficiently good mechanical properties when used to form relatively thin parts. Contrary to conventional thought, however, the present inventors have discovered that through careful control over the particular materials employed (e.g., nature of the long fibers, propylene polymer, chain-scission agent, etc.) and the manner in which they are processed (e.g., impregnation techniques, pultrusion techniques, etc.), thin parts can be formed from the fiber-reinforced composition that still possess excellent mechanical properties. The ability to achieve enhanced mechanical properties even at low viscosities is due in part to the high fiber length that can be retained in the composition after it is formed. Without intending to be limited by theory, it is believed that the low viscosity of the polymer matrix can minimize the degree to which the long fibers are abraded during extrusion and processing, thereby maximizing the overall length of the fibers. Thus, for example, the median length (the value of the fiber length at 50% in the cumulative distribution curve, also known as "D50") of the fibers in the composition is typically about 1 millimeter or more, in some embodiments about 1.5 millimeters or more, in some embodiments about 2.0 millimeters or more, and in some embodiments, from about 2.5 to about 8 millimeters.

Due to the unique properties noted above, a part formed from the composition may exhibit excellent mechanical properties. For example, the part may exhibit a Charpy unnotched impact strength greater than about 15 kJ/m$^2$, in some embodiments from about 20 to about 80 kJ/m$^2$, and in some embodiments, from about 30 to about 60 kJ/m$^2$, measured at according to ISO Test No. 179-1:2010) (technically equivalent to ASTM D256-10e1) at various temperatures, such as −30° C., 23° C., or 80° C. The tensile and flexural mechanical properties may also be good. For example, the parts formed from the composition may exhibit a tensile strength of from about 20 to about 300 MPa, in some embodiments from about 30 to about 200 MPa, and in some embodiments, from about 40 to about 150 MPa; a tensile break strain of about 0.5% or more, in some embodiments from about 0.6% to about 5%, and in some embodiments, from about 0.7% to about 2.5%; and/or a tensile modulus of from about 3,500 MPa to about 20,000 MPa, in some embodiments from about 4,000 MPa to about 15,000 MPa, and in some embodiments, from about 5,000 MPa to about 10,000 MPa. The tensile properties may be determined in accordance with ISO Test No. 527-1:2012 (technically equivalent to ASTM D638-14) at −30° C., 23° C., or 80° C. Parts formed from the fiber-reinforced composition may also exhibit a flexural strength of from about 50 to about 500 MPa, in some embodiments from about 80 to about 400 MPa, and in some embodiments, from about 100 to about 250 MPa and/or a flexural modulus of from about 2000 MPa to about 20,000 MPa, in some embodiments from about 3,000 MPa to about 15,000 MPa, and in some embodiments, from about 4,000 MPa to about 10,000 MPa. The flexural properties may be determined in accordance with ISO Test No. 178:2010 (technically equivalent to ASTM D790-15e2) at −30° C., 23° C., or 80° C.

The present inventors have also discovered that the fiber-reinforced composition is not highly sensitive to aging at high temperatures. For example, a part formed from the fiber-reinforced composition may be aged in an atmosphere having a temperature of from about 100° C. or more, in some embodiments from about 120° C. to about 200° C., and in some embodiments, from about 130° C. to about 180° C. (e.g., 150° C.) for a time period of about 100 hours or more, in some embodiments from about 300 hours to about 3000 hours, and in some embodiments, from about 400 hours to about 2500 hours (e.g., about 1,000 hours). Even after aging, the mechanical properties (e.g., impact strength, tensile properties, and/or flexural properties) may remain within the ranges noted above. For example, the ratio of a particular mechanical property (e.g., Charpy unnotched impact strength, flexural strength, etc.) after "aging" at 150° C. for 1,000 hours to the initial mechanical property prior to such aging may be about 0.6 or more, in some embodiments about 0.7 or more, and in some embodiments, from about 0.8 to 1.0. In one embodiment, for example, a thin part (e.g., 1.2 mm in thickness) may exhibit a Charpy unnotched impact strength after being aged at a high temperature (e.g., 150° C.) for 1,000 hours of greater than about 15 kJ/m$^2$, in some embodiments from about 20 to about 80 kJ/m$^2$, and in some embodiments, from about 30 to about 60 kJ/m$^2$, measured according to ISO Test No. 179-1:2010 at a temperature of 23° C.) (technically equivalent to ASTM D256-10e1). The thin part (e.g., 1.2 mm in thickness) may also, for example, exhibit a flexural strength after being aged at a high temperature atmosphere (e.g., 150° C.) for 1,000 hours of about 50 to about 500 MPa, in some embodiments from about 80 to about 400 MPa, and in some embodiments, from about 100 to about 250 MPa, measured according to ISO Test No. 178:2010 at a temperature of 23° C. (technically equivalent to ASTM D790-15e2). Likewise, the thin part (e.g., 1.2 mm in thickness) may also exhibit a tensile strength after being aged at a high temperature atmosphere (e.g., 150° C.) for 1,000 hours of from about 20 to about 300 MPa, in some embodiments from about 30 to about 200 MPa, and in some embodiments, from about 40 to about 150 MPa as determined at a temperature of 23° C. in accordance with ISO Test No. 527-1:2012 (technically equivalent to ASTM D638-14).

The composition may also exhibit low emissions of volatile organic compounds. As used herein, the term "volatile compounds" or "volatiles" generally refer to organic compounds that have a relatively high vapor pressure. For example, the boiling point of such compounds at atmospheric pressure (1 atmosphere) may be about 80° C. or less, in some embodiments about 70° C. or less, and in some embodiments, from about 0° C. to about 60° C. One example of such a compound is 2-methyl-1-propene. The present inventors have discovered that the resulting composition can exhibit low volatile emissions through selective control over the nature of the materials employed in the polymer composition and the particular manner in which they are combined together. For example, the fiber-reinforced composition may exhibit a total volatile content ("VOC") of about 100 micrograms equivalent carbon per gram of the composition ("μgC/g") or less, in some embodiments about 70 μg/g or less, in some embodiments about 50 μg/g or less, and in some embodiments, about 40 μg/g or less, as determined in accordance with VDA 277:1995. The composition may also exhibit a toluene equivalent volatile content ("TVOC") of about 250 micrograms equivalent toluene per gram of the composition ("μg/g") or less, in some embodiments about 150 μg/g or less, and in some embodiments, about 100 μg/g or less, as well as a fogging content ("FOG") of about 500 micrograms hexadecane per gram of the composition ("μg/g") or less, in some embodiments about 350 μg/g or less, and in some embodiments, about 300 μg/g or less, each of which may be determined in accordance with VDA 278:2002.

Various embodiments of the present invention will now be described in more detail.

I. Polymer Matrix

Any of a variety of propylene polymers or combinations of propylene polymers may generally be employed in the polymer matrix, such as propylene homopolymers (e.g., syndiotactic, atactic, isotactic, etc.), propylene copolymers, and so forth. In one embodiment, for instance, a propylene polymer may be employed that is an isotactic or syndiotactic homopolymer. The term "syndiotactic" generally refers to a tacticity in which a substantial portion, if not all, of the methyl groups alternate on opposite sides along the polymer chain. On the other hand, the term "isotactic" generally refers to a tacticity in which a substantial portion, if not all, of the methyl groups are on the same side along the polymer chain. Such homopolymers may have a melting point of from about 160° C. to about 170° C. In yet other embodiments, a copolymer of propylene with an α-olefin monomer may be employed. Specific examples of suitable α-olefin monomers may include ethylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. The propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Any of a variety of known techniques may generally be employed to form the propylene/α-olefin copolymers. For instance, olefin polymers may be formed using a free radical or a coordination catalyst (e.g., Ziegler-Natta). Typically, the copolymer is formed from a single-site coordination catalyst, such as a metallocene catalyst. Such a catalyst system produces copolymers in which the comonomer is randomly distributed within a molecular chain and uniformly distributed across the different molecular weight fractions. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers (Mw/Mn) of below 4, controlled short chain branching distribution, and controlled isotacticity.

It should be noted that the polymer matrix may contain a propylene polymer in combination with one or more additional polymers, which may or may not themselves be propylene polymers. In some embodiments, for instance, a blend of propylene polymers may be employed, such as a blend of a propylene homopolymer and a propylene/α-olefin copolymer, blend of multiple propylene homopolymers, or a blend of multiple propylene/α-olefin copolymers. In one particular embodiment, for instance, the polymer matrix contains at least one propylene homopolymer, which is typically metallocene-catalyzed. In such embodiments, the polymer matrix may contain only propylene homopolymers. Alternatively, the polymer matrix may contain a blend of a propylene homopolymer (e.g., metallocene-catalyzed) and a propylene/α-olefin copolymer, which may be metallocene-catalyzed or formed from other types of processes (e.g., Ziegler Natta-catalyzed). In one embodiment, a blend may be employed that contains propylene homopolymers in an amount of from about 30 wt. % to about 70 wt. %, in some embodiments from about 35 wt. % to about 65 wt. %, and in some embodiments, from about 40 wt. % to about 60 wt. % of the matrix, and propylene α-olefin copolymers in an amount of from about 30 wt. % to about 70 wt. %, in some embodiments from about 35 wt. % to about 65 wt. %, and in some embodiments, from about 40 wt. % to about 60 wt. % of the matrix.

Regardless of the polymers employed, the high flow composition is typically achieved by melt blending at least one relatively high viscosity propylene polymer with a chain-scission agent. The chain-scission agent may, for instance, be a free radical-generating functional compound, such as an organic peroxide, which can result in beta chain scission of the polymer backbone during the melt extrusion process. Among other things, this can reduce the molecular weight and melt viscosity of the polymer under shear to result in a "high flow" propylene polymer. Particularly suitable compounds for this purpose may include, for instance, persulfates, azonitroles (e.g., azobisisopropionitrile and azobisisobutyronitrile), peroxides (e.g., hydrogen peroxide, inorganic peroxides, organic peroxides, etc.), etc., as well as mixtures thereof. In one particular embodiment, for instance, an organic peroxide may be employed in the composition. Suitable organic peroxides may include those of the aliphatic hydrocarbon, aromatic hydrocarbon, carboxylic acid ester, ketone, or carbonic acid ester types, and specific examples include diisopropyl peroxide, ditertiary butyl peroxide, tertiary butyl hydroperoxide, dicumyl peroxide, dibenzoyl peroxide, cumyl hydroperoxide, tertiary butyl peracetate, tertiary butyl peroxy laurate, tertiary butyl perbenzoate, ditertiary butyl perphthalate, methylethylketone peroxide, octanol peroxide, and diisopropyl peroxycarbonate. Although the amount may vary, it is typically desired that the chain-scission agent is present in an amount of from about 0.001 wt. % to about 0.5 wt. %, in some embodiments from about 0.005 wt. % to about 0.1 wt %, and in some embodiments, from about 0.01 wt. % to 0.06 wt. %, based on weight of the propylene polymer.

During the melt blending process, the raw materials (e.g., propylene polymer, chain-scission agent, etc.) may be supplied either simultaneously or in sequence to a melt-blending device that dispersively blends the materials. Batch and/or continuous melt blending techniques may be employed. For example, a mixer/kneader, Banbury mixer, Farrel continuous mixer, single-screw extruder, twin-screw extruder, roll mill, etc., may be utilized to blend the materials. One particularly suitable melt-blending device is a co-rotating, twin-screw extruder (e.g., twin-screw extruder available from Coperion). Such extruders may include feeding and venting ports and provide high intensity distributive and dispersive mixing, which facilitate the chain scission reaction. For example, the propylene polymer may be fed to a feeding port of the twin-screw extruder and melted. Thereafter, the chain-scission agent may be injected into the polymer melt. Alternatively, the chain-scission agent may be separately fed into the extruder at a different point along its length. Regardless of the particular melt blending technique chosen, the raw materials are blended under high shear/pressure and heat to ensure sufficient mixing for initiating the chain scission reaction. For example, melt blending may occur at a temperature of from about 150° C. to about 300° C., in some embodiments, from about 155° C. to about 250° C., and in some embodiments, from about 160° C. to about 220° C.

As noted above, certain embodiments of the present invention contemplate the use of a blend of polymers within the polymer matrix (e.g., propylene homopolymers and/or propylene/α-olefin copolymers). In such embodiments, each of the polymers employed in the blend may be melt blended with the chain-scission agent to reduce melt viscosity in the manner described above. In yet other embodiments, however, it may be desired to melt blend a first propylene polymer (e.g., homopolymer or copolymer) with the chain-scission agent to form a concentrate, which is then reinforced with long fibers in the manner described below to form a precursor composition. The precursor composition may thereafter be blended (e.g., dry blended) with a second propylene polymer to form a fiber-reinforced composition with the desired melt flow properties. Notably, in such embodiments, the second propylene polymer does not appreciably react with the chain-scission agent and thus effectively acts as a viscosity enhancer such that the melt flow index of the precursor polymer matrix is actually lower than the melt flow index of the final blended polymer matrix. It should also be understood that additional polymers can also be added during prior to and/or during reinforcement of the polymer matrix with the long fibers.

II. Long Fibers

To form the fiber-reinforced composition of the present invention, long fibers are generally embedded within the polymer matrix. The term "long fibers" generally refers to fibers, filaments, yarns, or rovings (e.g., bundles of fibers) that are not continuous and have a length of from about 1 to about 25 millimeters, in some embodiments, from about 1.5 to about 20 millimeters, in some embodiments from about 2 to about 15 millimeters, and in some embodiments, from about 3 to about 12 millimeters. As noted above, due to the unique properties of the composition, a substantial portion of the fibers may maintain a relatively large length even after being formed into a shaped part (e.g., injection molding). That is, the median length (D50) of the fibers in the composition may be about 1 millimeter or more, in some embodiments about 1.5 millimeters or more, in some embodiments about 2.0 millimeters or more, and in some embodiments, from about 2.5 to about 8 millimeters.

The fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar®), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable. Such fibers often have a nominal diameter of about 4 to about 35 micrometers, and in some embodiments, from about 9 to about 35 micrometers. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

III. Technique for Forming the Fiber-Reinforced Composition

Any of a variety of different techniques may generally be employed to incorporate the fibers into the polymer matrix. The long fibers may be randomly distributed within the polymer matrix, or alternatively distributed in an aligned fashion. In one embodiment, for instance, continuous fibers may initially be impregnated into the polymer matrix to form strands, which are thereafter cooled and then chopped into pellets to that the resulting fibers have the desired length for the long fibers. In such embodiments, the polymer matrix and continuous fibers (e.g., rovings) are typically pultruded through an impregnation die to achieve the desired contact between the fibers and the polymer. Pultrusion can also help ensure that the fibers are spaced apart and oriented in a longitudinal direction that is parallel to a major axis of the pellet (e.g., length), which further enhances the mechanical properties. Referring to FIG. 1, for instance, one embodiment of a pultrusion process 10 is shown in which a polymer matrix is supplied from an extruder 13 to an impregnation die 11 while continuous fibers 12 are a pulled through the die 11 via a puller device 18 to produce a composite structure 14. Typical puller devices may include, for example, caterpillar pullers and reciprocating pullers. While optional, the composite structure 14 may also be pulled through a coating die 15 that is attached to an extruder 16 through which a coating resin is applied to form a coated structure 17. As shown in FIG. 1, the coated structure 17 is then pulled through the puller assembly 18 and supplied to a pelletizer 19 that cuts the structure 17 into the desired size for forming the long fiber-reinforced composition.

Figure 2:
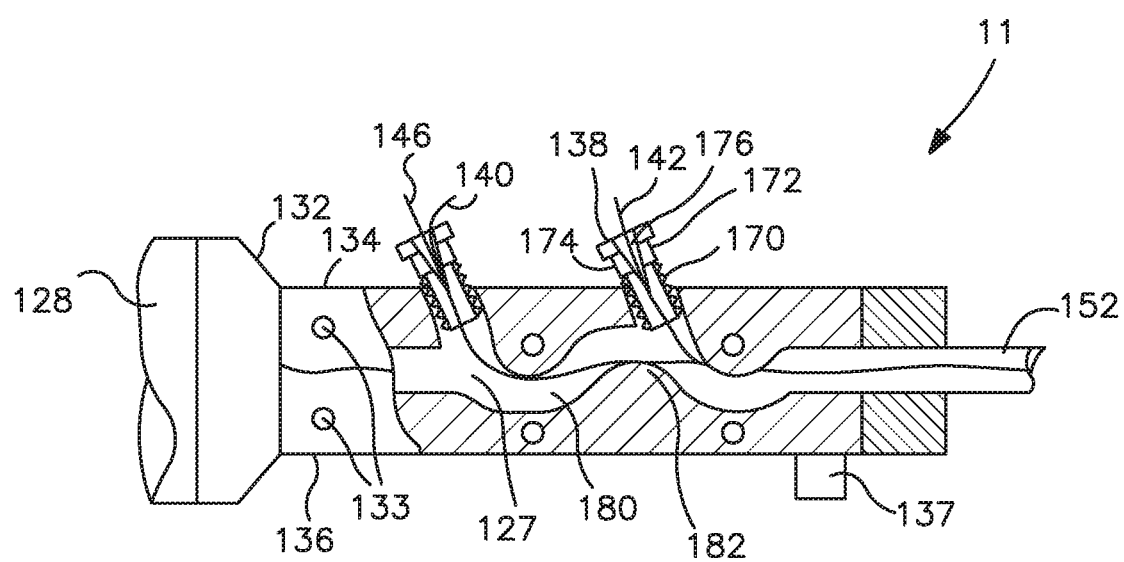
FIG. 2 is a cross-sectional view of an impregnation die that may be employed in the system shown in FIG. 1.

The nature of the impregnation die employed during the pultrusion process may be selectively varied to help achieved good contact between the polymer matrix and the long fibers. Examples of suitable impregnation die systems are described in detail in Reissue Pat. No. 32,772 to Hawley; U.S. Pat. No. 9,233,486 to Regan, et al.; and U.S. Pat. No. 9,278,472 to Eastep, et al. Referring to FIG. 2, for instance, one embodiment of such a suitable impregnation die 11 is shown. As shown, a polymer matrix 127, which may contain the reaction product of the propylene polymer and chain-scission agent, may be supplied to the impregnation die 11 via an extruder (not shown). More particularly, the polymer matrix 127 may exit the extruder through a barrel flange 128 and enter a die flange 132 of the die 11. The die 11 contains an upper die half 134 that mates with a lower die half 136. Continuous fibers 142 (e.g., roving) are supplied from a reel 144 through feed port 138 to the upper die half 134 of the die 11. Similarly, continuous fibers 146 are also supplied from a reel 148 through a feed port 140. The matrix 127 is heated inside die halves 134 and 136 by heaters 133 mounted in the upper die half 134 and/or lower die half 136. The die is generally operated at temperatures that are sufficient to cause melting and impregnation of the thermoplastic polymer. Typically, the operation temperatures of the die is higher than the melt temperature of the polymer matrix. When processed in this manner, the continuous fibers 142 and 146 become embedded in the matrix 127. The mixture is then pulled through the impregnation die 11 to create a fiber-reinforced composition 152. If desired, a pressure sensor 137 may also sense the pressure near the impregnation die 11 to allow control to be exerted over the rate of extrusion by controlling the rotational speed of the screw shaft, or the federate of the feeder.

Within the impregnation die, it is generally desired that the fibers contact a series of impingement zones. At these zones, the polymer melt may flow transversely through the fibers to create shear and pressure, which significantly enhances the degree of impregnation. This is particularly useful when forming a composite from ribbons of a high fiber content. Typically, the die will contain at least 2, in some embodiments at least 3, and in some embodiments, from 4 to 50 impingement zones per roving to create a sufficient degree of shear and pressure. Although their particular form may vary, the impingement zones typically possess a curved surface, such as a curved lobe, rod, etc. The impingement zones are also typically made of a metal material.

FIG. 2 shows an enlarged schematic view of a portion of the impregnation die 11 containing multiple impingement zones in the form of lobes 182. It should be understood that this invention can be practiced using a plurality of feed ports, which may optionally be coaxial with the machine direction. The number of feed ports used may vary with the number of fibers to be treated in the die at one time and the feed ports may be mounted in the upper die half 134 or the lower die half 136. The feed port 138 includes a sleeve 170 mounted in upper die half 134. The feed port 138 is slidably mounted in a sleeve 170. The feed port 138 is split into at least two pieces, shown as pieces 172 and 174. The feed port 138 has a bore 176 passing longitudinally therethrough. The bore 176 may be shaped as a right cylindrical cone opening away from the upper die half 134. The fibers 142 pass through the bore 176 and enter a passage 180 between the upper die half 134 and lower die half 136. A series of lobes 182 are also formed in the upper die half 134 and lower die half 136 such that the passage 210 takes a convoluted route. The lobes 182 cause the fibers 142 and 146 to pass over at least one lobe so that the polymer matrix inside the passage 180 thoroughly contacts each of the fibers. In this manner, thorough contact between the molten polymer and the fibers 142 and 146 is assured.

To further facilitate impregnation, the fibers may also be kept under tension while present within the impregnation die. The tension may, for example, range from about 5 to about 300 Newtons, in some embodiments from about 50 to about 250 Newtons, and in some embodiments, from about 100 to about 200 Newtons per tow of fibers. Furthermore, the fibers may also pass impingement zones in a tortuous path to enhance shear. For example, in the embodiment shown in FIG. 2, the fibers traverse over the impingement zones in a sinusoidal-type pathway. The angle at which the rovings traverse from one impingement zone to another is generally high enough to enhance shear, but not so high to cause excessive forces that will break the fibers. Thus, for example, the angle may range from about 1° to about 30°, and in some embodiments, from about 5° to about 25°.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

The fiber-reinforced composition may generally be employed to form a shaped part using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the fiber-reinforced composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the fiber-reinforced composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity.

Regardless of the shaping technique employed, a wide variety of parts may be formed from the fiber-reinforced composition of the present invention. For example, the present inventors have discovered that the fiber-reinforced composition is particularly suitable for use in interior and exterior automotive parts (e.g., injection molded parts). Suitable exterior automotive parts may include fan shrouds, sunroof systems, door panels, front end modules, side body panels, underbody shields, bumper panels, cladding (e.g., near the rear door license plate), cowls, spray nozzle body, capturing hose assembly, pillar cover, rocker panel, etc.

Likewise, suitable interior automotive parts that may be formed from the fiber-reinforced composition of the present invention may include, for instance, pedal modules, instrument panels (e.g., dashboards), arm rests, consoles (e.g., center consoles), seat structures (e.g., backrest of the rear bench or seat covers), interior modules (e.g., trim, body panel, or door module), lift gates, interior organizers, step assists, ash trays, glove boxes, gear shift levers, etc. Other suitable parts may include siding panels, fence picket parts, end caps, joints, hinges, trim boards for interior and exterior decoration, synthetic roofing shingles, slates, shakes or panels, etc.

The present invention may be better understood with reference to the following examples.

Test Methods

Melt Flow Index:

The melt flow index of a polymer or polymer composition may be determined in accordance with ISO 1133-1:2011 (technically equivalent to ASTM D1238-13) at a load of 2.16 kg and temperature of 230° C.

Spiral Flow Length:

The term "spiral flow length" generally refers to the length reached by the flow of the composition in a spiral flow channel when it is injected at constant injection temperature and injection pressure from a central gate of a mold in which the spiral flow channel is formed. The spiral flow length may be determined in accordance with ASTM D3123-09 at a barrel temperature of 230° C., molding temperature of 40° C. to 60° C., and a maximum injection pressure of 860 bar.

Volatile Organic Content ("VOC"):

The total volatile organic content may be determined in accordance with an automotive industry standard test known as VDA 277:1995. In this test, for instance, a gas chromatography (GC) device may be employed with a WCOT-capillary column (wax type) of 0.25 mm inner diameter and 30 m length. The GC settings may be as follows: 3 minutes isothermal at 50° C., heat up to 200° C. at 12 K/min, 4 minutes isothermal at 200° C., injection-temperature of 200° C., detection-temperature of 250° C., carrier is helium, flow-mode split of 1:20 and average carrier-speed of 22-27 cm/s. A flame ionization detector ("FID") may be employed to determine the total volatile content and a mass spectrometry ("MS") detector may also be optionally employed to determine single volatile components. After testing, the VOC amount is calculated by dividing the amount of volatiles (micrograms of carbon equivalents) by the weight (grams) of the composition.

Toluene Volatile Organic Content ("TVOC"):

The toluene-equivalent volatile organic content may be determined in accordance with an automotive industry standard test known as VDA 278:2002. More particularly, measurements may be made on a sample using a thermaldesoprtion analyzer ("TDSA"), such as supplied by Gerstel using helium 5.0 as carrier gas and a column HP Ultra 2 of 50 m length and 0.32 mm diameter and 0.52 µm coating of 5% phenylmethylsiloxane. The analysis may, for example, be performed using device setting 1 and the following parameters: flow mode of splitless, final temperature of 90° C.; final time of 30 min, and rate of 60 K/min. The cooling trap may be purged with a flow-mode split of 1:30 in a temperature range from −150° C. to +280° C. with a heating rate of 12 K/sec and a final time of 5 min. For analysis, the gas chromatography ("GC") settings may be 2 min isothermal at 40° C., heating at 3 K/min up to 92° C., then at 5 K/min up to 160° C., and then at 10 K/min up to 280° C., 10 minutes isothermal, and flow of 1.3 ml/min. After testing, the TVOC amount is calculated by dividing the amount of volatiles (micrograms of toluene equivalents) by the weight (grams) of the composition.

Fogging Content ("FOG"):

The fogging content may be determined in accordance with an automotive industry standard test known as VDA 278:2002. More particularly, measurements may be made on a sample using a thermaldesoprtion analyzer ("TDSA"), such as supplied by Gerstel using helium 5.0 as carrier gas and a column HP Ultra 2 of 50 m length and 0.32 mm diameter and 0.52 µm coating of 5% phenylmethylsiloxane. The analysis may, for example, be performed using device setting 1 and the following parameters: flow mode of splitless, final temperature of 120° C.; final time of 60 min, and rate of 60 K/min in. The cooling trap may be purged with a flow-mode split of 1:30 in a temperature range from −150° C. to +280° C. with a heating rate of 12 K/sec. For analysis, the gas chromatography ("GC") settings may be 2 min isothermal at 50° C., heating at 25 K/min up to 160° C., then at 10 K/min up to 280° C., 30 minutes isothermal, and flow of 1.3 ml/min. After testing, the FOG amount is calculated by dividing the amount of volatiles (micrograms of hexadecane equivalents) by the weight (grams) of the composition.

Tensile Modulus, Tensile Stress, and Tensile Elongation at Break:

Tensile properties may be tested according to ISO Test No. 527-1:2012 (technically equivalent to ASTM D638-14). Modulus and strength measurements may be made on a dogbone-shaped test strip sample having a length of 170/190 mm, thickness of 4 mm, and width of 10 mm. The testing temperature may be −30° C., 23° C., or 80° C. and the testing speeds may be 1 or 5 mm/min.

Flexural Modulus, Flexural Elongation at Break, and Flexural Stress:

Flexural properties may be tested according to ISO Test No. 178:2010 (technically equivalent to ASTM D790-15e2). This test may be performed on a 64 mm support span. Tests may be run on the center portions of uncut ISO 3167 multi-purpose bars. The testing temperature may be −30° C., 23° C., or 80° C. and the testing speed may be 2 mm/min.

Unotched and Notched Charpy Impact Strength:

Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be −30° C., 23° C., or 80° C.

Deflection Temperature Under Load ("DTUL"):

The deflection under load temperature may be determined in accordance with ISO Test No. 75-2:2013 (technically equivalent to ASTM D648-07). More particularly, a test strip sample having a length of 80 mm, width of 10 mm, and thickness of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Example 1

A sample is formed that contains approximately 33.3 wt. % of a metallocene-catalyzed propylene homopolymer (melt flow index of 140 g/10 min, density of 0.905 g/cm$^3$), 0.9 wt. % of a peroxide, 2 wt. % of a coupling agent, 0.6 wt. % of a black pigment, 3.2 wt. % stabilizers, and 60 wt. % continuous glass fiber rovings (2400 Tex, filament diameter of 16 μm). The sample is melt processed in a single screw extruder (90 mm) in which the melt temperature is 265° C., the die temperature is 330° C., and the zone temperatures range from 160° C. to 320° C., and the screw speed is 160 rpm. The melt flow index of the resulting sample is 500 g/10 min and the median length of the glass fibers ("D50") is 3.171 mm.

Example 2

A sample is formed as described in Example 1 and then blended down with a metallocene-catalyzed propylene homopolymer (melt flow index of 140 g/10 min, density of 0.905 g/cm$^3$) so that the glass fiber rovings are present in an amount of about 20 wt. %. The melt flow index of the resulting sample is 230 g/10 min.

Example 3

A sample is formed as described in Example 1 and then blended down with a metallocene-catalyzed propylene homopolymer (melt flow index of 140 g/10 min, density of 0.905 g/cm$^3$) so that the glass fiber rovings are present in an amount of about 30 wt. %. The melt flow index of the resulting sample is 260 g/10 min.

Example 4

A sample is formed as described in Example 1 and then blended down with a metallocene-catalyzed propylene homopolymer (melt flow index of 140 g/10 min, density of 0.905 g/cm$^3$) so that the glass fiber rovings are present in an amount of about 40 wt. %. The melt flow index of the resulting sample is 300 g/10 min.

Molded specimens having a thickness of 1.2 mm, 1.6 mm, and 4 mm may be formed from the samples of Examples 1-4 using the following process conditions: nozzle temperature of 250° C., injection pressure of 1025 bar, back pressure of 650 bar, injection speed of 16.6 millimeters per second, and molding temperature of 40° C. Parts having a thickness of 1.2 mm and 4 mm are tested at 23° C. and then after heat aging at 150° C. for 1,000 hours. The results are set forth below in Tables 1-2.

TABLE 1

Properties for Parts Having a Thickness of 4 mm

| | Units | Example 1 | Example 2 | Example 3 | Example 4 |
|---|---|---|---|---|---|
| Tensile modulus (1 mm/min) 23° C. | MPa | 14781 | 4970 | 7494 | 9436 |
| Tensile modulus 80° C. | MPa | 10326 | — | — | — |
| Tensile strength 23° C. | MPa | 145 | 96 | 125 | 138 |
| Tensile strength 80° C. | MPa | 84.8 | | | |
| Tensile strain @ break (5 mm/min) 23° C. | % | 1.43 | 2.52 | 2.19 | 2.02 |
| Tensile strain @ break (5 mm/min) 80° C. | % | 1.51 | — | — | — |
| Flexural modulus 23° C. | MPa | 16332 | 4917 | 7011 | 9062 |
| Flexural modulus 80° C. | MPa | 11127 | 2969 | 4309 | 5424 |
| Flexural strength 23° C. | MPa | 246 | 135 | 176 | 207 |
| Flexural strength 80° C. | MPa | 146 | 98 | 125 | 139 |
| Flexural strain 23° C. | % | 2.07 | 3.24 | 3.05 | 2.85 |
| Flexural strain 80° C. | % | 2.6 | 3.67 | 3.32 | 3.14 |
| Unnotched Charpy impact strength 23° C. | kJ/m$^2$ | 64 | 46 | 59 | 68 |
| Unnotched Charpy impact strength −30° C. | kJ/m$^2$ | 80 | 25 | 41 | 55 |
| Charpy notched impact strength 23° C. | kJ/m$^2$ | 32 | 13 | 21 | 26 |
| Charpy notched impact strength −30° C. | kJ/m$^2$ | 39 | 19 | 27 | 31 |
| DTUL | ° C. | 151 | 151 | 152 | 152 |
| Spiral Flow | T = 2 mm | 426 | 842 | 744 | 613 |

TABLE 2

Properties for Parts Having a Thickness of 1.2 mm

| | Units | Example 3 (23° C.) | Example 3 (23° C., after aging at 150° C. |
|---|---|---|---|
| Tensile modulus (1 mm/min) | MPa | 6,379 | 6,630 |
| Tensile strength | MPa | 87.1 | 59.7 |
| Tensile strain @ break (5 mm/min) | % | 1.76 | 1.04 |
| Flexural modulus | MPa | 5,445 | 5,780 |
| Flexural strength | MPa | 154 | 147 |
| Unnotched Charpy impact strength | kJ/m$^2$ | 39.1 | 32.2 |
| Spiral Flow | T = 2 mm | 802 | — |

The organic volatile content of Examples 1-4 was also determined as described herein, and the results are set forth in the table below.

| | Units | Example 1 | Example 2 | Example 3 | Example 4 |
|---|---|---|---|---|---|
| VOC | μgC/g | 31 | 14 | 13 | 12 |
| TVOC | μg/g | 213 | 43 | 46 | 92 |
| FOG | μg/g | 337 | 128 | 132 | 212 |

Example 5

A sample is formed as described in Example 1 and then blended down with a propylene impact copolymer (melt flow index of 100 g/10 min) so that the glass fiber rovings are present in an amount of about 20 wt. %.

Example 6

A sample is formed as described in Example 1 and then blended down with a propylene impact copolymer (melt flow index of 100 g/10 min) so that the glass fiber rovings are present in an amount of about 30 wt. %.

Example 7

A sample is formed as described in Example 1 and then blended down with a propylene impact copolymer (melt flow index of 100 g/10 min) so that the glass fiber rovings are present in an amount of about 40 wt. %.

Molded specimens having a thickness of 4 mm may be formed from the samples of Examples 5-7 using the following process conditions: nozzle temperature of 250° C., injection pressure of 1025 bar, back pressure of 650 bar, injection speed of 16.6 millimeters per second, and molding temperature of 40° C. Parts having a thickness of 4 mm are tested at 23° C. The results are set forth below.

|  | Units | Example 5 | Example 6 | Example 7 |
|---|---|---|---|---|
| Tensile modulus (1 mm/min) 23° C. | MPa | 4,928 | 6,840 | 9,086 |
| Tensile strength 23° C. | MPa | 87 | 110 | 131 |
| Tensile strain @ break (5 mm/min) 23° C. | % | 2.39 | 2.16 | 2.03 |
| Flexural modulus 23° C. | MPa | 4,733 | 6,630 | 8,869 |
| Flexural strength 23° C. | MPa | 124.6 | 161.0 | 190.4 |
| Flexural strain 23° C. | % | 3.15 | 3.00 | 2.74 |
| Spiral Flow | T = 2 mm | 868 | 755 | 644 |

Example 8

A sample is formed that contains approximately 33.3 wt. % of a propylene impact copolymer (melt flow index of 100 g/10 min, 0.9 wt. % of a peroxide, 2 wt. % of a coupling agent, 0.6 wt. % of a black pigment, 3.2 wt. % stabilizers, and 60 wt. % continuous glass fiber rovings (2400 Tex, filament diameter of 16 μm). The sample is melt processed in a single screw extruder (90 mm) in which the melt temperature is 265° C., the die temperature is 330° C., and the zone temperatures range from 160° C. to 320° C., and the screw speed is 160 rpm.

Example 9

A sample is formed as described in Example 8 and then blended down with a metallocene-catalyzed propylene homopolymer (melt flow index of 140 g/10 min, density of 0.905 g/cm³) so that the glass fiber rovings are present in an amount of about 20 wt. %.

Example 10

A sample is formed as described in Example 8 and then blended down with a metallocene-catalyzed propylene homopolymer (melt flow index of 140 g/10 min, density of 0.905 g/cm³) so that the glass fiber rovings are present in an amount of about 30 wt. %.

Molded specimens may be formed from the samples of Examples 9-10 using the following process conditions: nozzle temperature of 250° C., injection pressure of 1025 bar, back pressure of 650 bar, injection speed of 16.6 millimeters per second, and molding temperature of 40° C. Parts having a thickness of 1.2 mm are tested for impact strength, spiral flow, and volatile content. The results are set forth below.

|  | Units | Example 9 | Example 10 |
|---|---|---|---|
| Unnotched Charpy Impact Strength at −30° C. | kJ/m² | 32.6 | 57.4 |
| Spiral Flow | T = 2 mm | 950 | 794 |
| VOC | μgC/g | 34.3 | 50.2 |
| TVOC | μg/g | 64.1 | 108.3 |
| FOG | μg/g | 192.8 | 196.6 |

Example 11

A sample is formed that contains approximately 74.8 wt. % of a metallocene-catalyzed propylene homopolymer (melt flow index of 32 g/10 m in, density of 0.90 g/cm³), 0.75 wt. % of a peroxide, 1.6 wt. % of a coupling agent, 1.2 wt. % of a black pigment, 2.3 wt. % stabilizers/additives, and 20 wt. % continuous glass fiber rovings. The sample is melt processed in a twin screw extruder (26 mm) in which the melt temperature is 230° C., the die temperature is 250° C., and the zone temperatures range from 200° C. to 250° C., and the screw speed is 250 rpm. The melt flow index of the resulting sample is 250 g/10 min.

Example 12

A sample is formed that contains approximately 74.9 wt. % of a metallocene-catalyzed propylene copolymer (melt flow index of 35 g/10 min), 1.28 wt. % of a peroxide, 1.6 wt. % of a coupling agent, 1.2 wt. % of a black pigment, 2.2 wt. % stabilizers/additives, and 20 wt. % continuous glass fiber rovings. The sample is melt processed in a single screw extruder (90 mm) in which the melt temperature is 230° C., the die temperature is 250° C., and the zone temperatures range from 200° C. to 250° C., and the screw speed is 250 rpm. The melt flow index of the resulting sample is 250 g/10 min.

Example 13

A sample is formed that contains approximately 65.8 wt. % of a metallocene-catalyzed propylene homopolymer (melt flow index of 65 g/10 m in, density of 0.90 g/cm³), 0.66 wt. % of a peroxide, 1.4 wt. % of a coupling agent, 1.1 wt. % of a black pigment, 1.7 wt. % stabilizers/additives, and 30 wt. % continuous glass fiber rovings. The sample is melt processed in a single screw extruder (90 mm) in which the melt temperature is 230° C., the die temperature is 250° C., and the zone temperatures range from 200° C. to 250° C., and the screw speed is 250 rpm. The melt flow index of the resulting sample is 250 g/10.

Example 14

A sample is formed that contains approximately 65.5 wt. % of a metallocene-catalyzed propylene copolymer (melt flow index of 35 g/10 min), 1.12 wt. % of a peroxide, 1.4 wt. % of a coupling agent, 1.1 wt. % of a black pigment, 2.0 wt. % stabilizers/additives, and 30 wt. % continuous glass fiber rovings. The sample is melt processed in a single screw extruder (90 mm) in which the melt temperature is 230° C., the die temperature is 250° C., and the zone temperatures range from 200° C. to 250° C., and the screw speed is 250 rpm. The melt flow index of the resulting sample is 250 g/10 min.

Molded specimens may be formed from the samples of Examples 11-14 using the following process conditions: nozzle temperature of 250° C., injection pressure of 1025 bar, back pressure of 650 bar, injection speed of 16.6 millimeters per second, and molding temperature of 40° C. Parts having a thickness of 4 mm are tested for tensile properties, flexural properties, impact strength, spiral flow, and volatile content. The results are set forth below.

|  | Units | Example 11 | Example 12 | Example 13 | Example 14 |
| --- | --- | --- | --- | --- | --- |
| Tensile Modulus (1 mm/min) 23° C. | MPa | 4,507 | 4,693 | 6,635 | 5,867 |
| Tensile Modulus (1 mm/min) 23° C., after aging at 150° C. for 1000 hrs | MPa | 5,244 | 5,179 | 7,227 | 6,293 |
| Tensile strength 23° C., after aging at 150° C. for 1000 hrs | MPa | 86.7 | 80.2 | 100.6 | 168.2 |
| Tensile Strength 150° C., 1000 hrs | MPa | 64 | 61 | 76 | 82 |
| Flexural Modulus 23° C. | MPa | 4,578 | 4,586 | 6,371 | 5,995 |
| Flexural Strength 23° C. | MPa | 150.3 | 141.1 | 177.7 | 168.2 |
| Notched Impact Strength 23° C. | $kJ/m^2$ | 14.04 | 51.22 | 22.83 | 63.05 |
| Spiral Flow | T = 2 mm | 1,213 | 1,108 | 1,148 | 1,009 |
| VOC | µgC/g | 2.76 | 16.58 | — | — |
| FOG | µg/g | 20.15 | 27.12 | — | — |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fiber-reinforced polymer composition having a longitudinal direction, the composition comprising:
   a polymer matrix that contains a propylene, wherein the polymer matrix constitutes from about 30 wt. % to about 80 wt. % of the composition; and
   a plurality of long reinforcing glass fibers that are distributed within the polymer matrix in a manner such that the fibers are spaced apart and oriented in a direction parallel to the longitudinal direction of the composition, wherein the fibers constitute from about 20 wt. % to about 70 wt. % of the composition, wherein the polymer composition exhibits a spiral flow length of about 450 millimeters or more as determined in accordance with ASTM D3123-09, and further wherein after being aged at 150° C. for 1,000 hours, the composition exhibits a Charpy unnotched impact strength greater than about 15 $kJ/m^2$ as determined at a temperature of 23° C. in accordance with ISO Test No. 179-1:2010.

2. The fiber-reinforced polymer composition of claim 1, wherein the propylene polymer has a melt flow index of about 150 grams per 10 minutes or more as determined in accordance with ISO 1133-1:2011 at a load of 2.16 kg.

3. The fiber-reinforced polymer composition of claim 1, wherein the propylene polymer has a melt flow index of about 180 grams per 10 minutes or more as determined in accordance with ISO 1133-1:2011 at a load of 2.16 kg and temperature of 230° C.

4. The fiber-reinforced polymer composition of claim 1, wherein the fibers have a median length of about 1 millimeter or more and constitute from about 20 wt. % to about 70 wt. % of the composition.

5. The fiber-reinforced polymer composition of claim 1, wherein the polymer matrix contains a propylene homopolymer, propylene/α-olefin copolymer, or a combination thereof.

6. The fiber-reinforced polymer composition of claim 1, wherein the composition is formed by a process that includes melt blending a propylene polymer with a chain-scission agent to form a high flow propylene polymer having a melt flow index of about 150 grams per 10 minutes or more as determined in accordance with ISO 1133-1:2011 at a load of 2.16 kg and temperature of 230° C., extruding the high flow propylene polymer through an impregnation die, and pulling a plurality of fibers through the impregnation die for contact with the polymer to form the fiber-reinforced composition.

7. The fiber-reinforced polymer composition of claim 6, wherein the chain-scission agent includes an organic peroxide.

8. The fiber-reinforced polymer composition of claim 6, wherein the chain-scission agent is present in an amount of from about 0.001 wt. % to about 0.5 wt. %, based on weight of the propylene polymer.

9. The fiber-reinforced polymer composition of claim 6, wherein the composition comprises an additional propylene polymer that is blended with the fiber-reinforced composition.

10. The fiber-reinforced polymer composition of claim 1, wherein the composition is in the form of a pellet and the fibers are oriented in a longitudinal direction of the pellet.

11. The fiber-reinforced polymer composition of claim 1, wherein the composition exhibits a Charpy unnotched impact strength greater than about 15 $kJ/m^2$ as determined at a temperature of −30° C. in accordance with ISO Test No. 179-1:2010.

12. The fiber-reinforced polymer composition of claim 1, wherein the ratio of the Charpy unnotched impact strength after aging to the Charpy unnotched impact strength prior to aging is about 0.6 or more.

13. The fiber-reinforced polymer composition of claim 1, wherein the composition exhibits a tensile strength of from about 20 to about 300 MPa, a tensile break strain of about 0.5% or more, and/or a tensile modulus of from about 3,500

MPa to about 20,000 MPa, as determined in accordance with ISO Test No. 527-1:2012 at 23° C.

14. The fiber-reinforced polymer composition of claim 1, wherein after aging at a temperature of 150° C. for 1,000 hours, the composition exhibits a tensile strength of from about 20 to about 300 MPa as determined at a temperature of 23° C. in accordance with ISO Test No. 527-1:2012.

15. The fiber-reinforced polymer composition of claim 1, wherein the composition exhibits a flexural strength of from about 50 to about 500 MPa and/or a flexural modulus of from about 2000 MPa to about 20,000 MPa, as determined in accordance with ISO Test No. 178:2010 at 23° C.

16. The fiber-reinforced polymer composition of claim 1, wherein after aging at a temperature of 150° C. for 1,000 hours, the composition exhibits a flexural strength of from about 50 to about 500 MPa as determined at a temperature of 23° C. in accordance with ISO Test No. 178:2010.

17. The fiber-reinforced polymer composition of claim 16, wherein the ratio of the flexural strength of the part after aging to the flexural strength prior to aging is about 0.6 or more.

18. A shaped part having a wall thickness of about 2 millimeters or less that comprises the fiber-reinforced composition of claim 1.

19. The shaped part of claim 18, wherein the part is injection molded.

20. The shaped part of claim 19, wherein the part is formed with an injection pressure of about 750 bar or less.

21. An automotive part comprising the fiber-reinforced polymer composition of claim 1.

22. The automotive part of claim 21, wherein the automotive part is an exterior automotive part.

23. The automotive part of claim 22, wherein the exterior automotive part is a fan shroud, sunroof system, door panel, front end module, side body panel, underbody shield, bumper panel, cladding, cowl, spray nozzle body, capturing hose assembly, pillar cover, rocker panel, or a combination thereof.

24. The automotive part of claim 21, wherein the part is an interior automotive part.

25. The automotive part of claim 24, wherein the part is a pedal module, instrument panel, arm rest, console, seat structure, interior module, lift gate, interior organizer, step assist, ash tray, glove box, gear shift lever, or a combination thereof.

26. The fiber-reinforced polymer composition of claim 1, wherein the composition exhibits a flexural modulus of from about 2,000 MPa to 10,000 MPa as determined in accordance with ISO Test No. 178:2010 at a temperature of 23° C.

27. The fiber-reinforced polymer composition of claim 26, wherein the composition further exhibits a flexural strength of from about 50 to about 500 MPa as determined in accordance with ISO Test No. 178:2010 at a temperature of 23° C.

28. The fiber-reinforced polymer composition of claim 1, wherein the composition exhibits a tensile strength of from about 40 to about 300 MPa as determined in accordance with ISO Test No. 527-1:2012 at a temperature of 23° C.

29. The fiber-reinforced polymer composition of claim 28, wherein the composition exhibits a tensile strength after aging at 150° C. for 1,000 hours, wherein the ratio of the aged tensile strength to the tensile strength prior to aging is about 0.6 or more, as determined in accordance with ISO Test No. 527-1:2012 at a temperature of 23° C.

30. The fiber-reinforced polymer composition of claim 28, wherein the composition further exhibits a tensile break strain of about 0.5% or more and a tensile modulus of from about 3,500 MPa to about 20,000 MPa, as determined in accordance with ISO Test No. 527-1:2012 at a temperature of 23° C.

31. The fiber-reinforced polymer composition of claim 1, wherein the composition is formed by a process that includes pultruding the reinforcing fibers and the polymer matrix through an impregnation die.

32. The fiber-reinforced polymer composition of claim 1, wherein the reinforcing fibers are in the form of rovings.

33. A fiber-reinforced polymer composition having a longitudinal direction, the composition comprising:
a polymer matrix that contains a first propylene polymer having a melt flow index from about 200 g/10 min to about 500 g/10 min as determined in accordance with ISO 1133-1:2011 at a load of 2.16 kg and temperature of 230° C. and a second propylene polymer having a melt flow index from about 50 to about 180 g/10 min as determined in accordance with ISO 1133-1:2011 at a load of 2.16 kg and temperature of 230° C., wherein the polymer matrix constitutes from about 30 wt. % to about 80 wt. % of the composition and the second propylene polymer constitutes from about 60 wt. % to about 86 wt. % of the polymer matrix; and
a plurality of long reinforcing glass fibers that are distributed within the polymer matrix in a manner such that the fibers are spaced apart and oriented in a direction parallel to the longitudinal direction of the composition, wherein the fibers constitute from about 20 wt. % to about 70 wt. % of the composition, wherein the polymer composition exhibits a spiral flow length of about 450 millimeters or more as determined in accordance with ASTM D3123-09, and further wherein after being aged at 150° C. for 1,000 hours, the composition exhibits a Charpy unnotched impact strength greater than about 15 kJ/m$^2$ as determined at a temperature of 23° C. in accordance with ISO Test No. 179-1:2010.

34. A fiber-reinforced polymer composition having a longitudinal direction, the composition comprising:
a propylene polymer having a melt flow index from about 150 to about 250 g/10 min as determined in accordance with ISO 1133-1:2011 at a load of 2.16 kg and temperature of 230° C., wherein the propylene polymer constitutes from about 30 wt. % to about 80 wt. % of the composition; and
a plurality of long reinforcing glass fibers that are distributed within the propylene polymer in a manner such that the fibers are spaced apart and oriented in a direction parallel to the longitudinal direction of the composition, wherein the fibers constitute from about 20 wt. % to about 70 wt. % of the composition, wherein the polymer composition exhibits a spiral flow length of about 450 millimeters or more as determined in accordance with ASTM D3123-09, and further wherein after being aged at 150° C. for 1,000 hours, the composition exhibits a Charpy unnotched impact strength greater than about 15 kJ/m$^2$ as determined at a temperature of 23° C. in accordance with ISO Test No. 179-1:2010.

\* \* \* \* \*